(12) United States Patent
Cosenza

(10) Patent No.: US 6,213,698 B1
(45) Date of Patent: Apr. 10, 2001

(54) STRUCTURAL BLIND BOLT

(75) Inventor: Frank J. Cosenza, Santa Barbara, CA (US)

(73) Assignee: Fairchild Holding Corp., Dulles, VA (US)

( * ) Notice: Subject to any disclaimer, the term of this patent is extended or adjusted under 35 U.S.C. 154(b) by 0 days.

(21) Appl. No.: 09/544,515

(22) Filed: Apr. 6, 2000

Related U.S. Application Data

(60) Provisional application No. 60/128,285, filed on Apr. 8, 1999.

(51) Int. Cl.[7] .............................. F16B 13/04; F16B 13/06
(52) U.S. Cl. ................................. 411/34; 411/43; 411/55
(58) Field of Search .................................. 411/34–38, 43, 411/55, 69

(56) References Cited

U.S. PATENT DOCUMENTS

| | | |
|---|---|---|
| 2,282,711 | 5/1942 | Eklund . |
| 3,521,521 | 7/1970 | King, Jr. et al. . |
| 3,596,948 | * 8/1971 | Spoehr ................................ 411/55 X |
| 4,659,271 | * 4/1987 | Pratt et al. .............................. 411/43 |
| 4,900,205 | * 2/1990 | Sadri ................................... 411/43 X |

* cited by examiner

*Primary Examiner*—Neill Wilson
(74) *Attorney, Agent, or Firm*—Christie, Parker & Hale, LLP

(57) ABSTRACT

A blind bolt assembly for compressively connecting at least two overlapping workpieces having a hollow bolt sized to be received within aligned aperture in the workpieces. The hollow bolt includes an enlarged head portion, a grip section extending from the head portion and reduced diameter externally threaded end portion extending from the grip section. An angled ramp section extends along the hollow bolt between the grip section and the threaded end portion. A core bolt having an elongated shaft is positioned within a cylindrical hole in the hollow bolt and includes a drive head extending outside of the hollow bolt. The blind bolt assembly includes a cylindrical collar having an internally threaded section for threadable receipt of the threaded end portion of the hollow bolt and a drive section for receipt of the drive portion of the core bolt. The drive portion of the core bolt and the drive section of the collar preferably include mating splines.

20 Claims, 4 Drawing Sheets

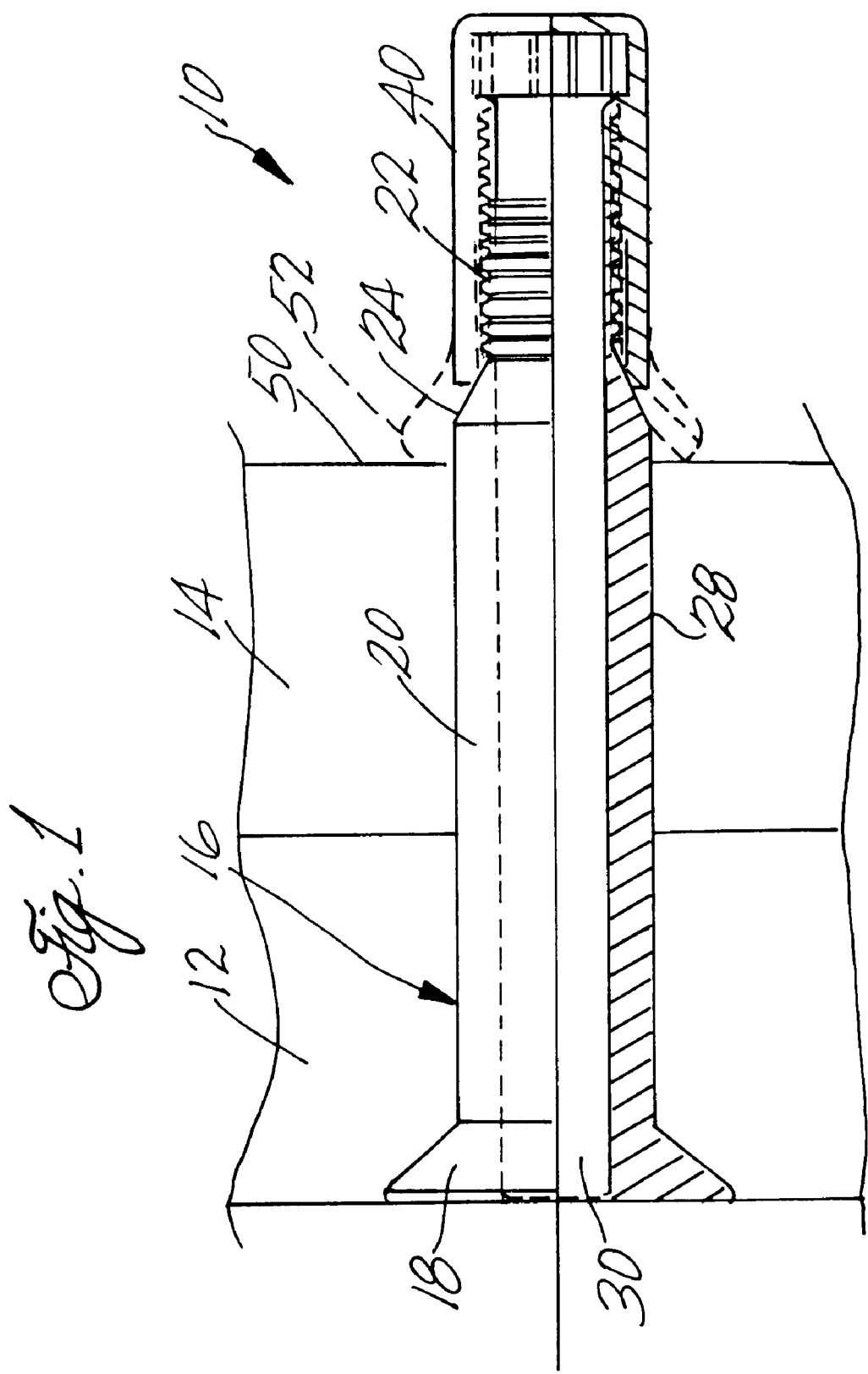

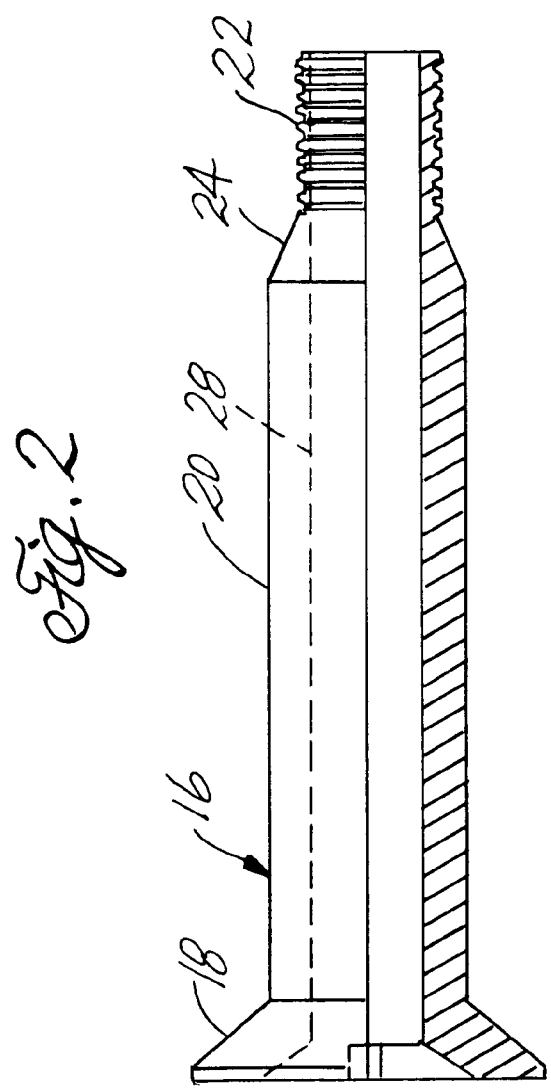
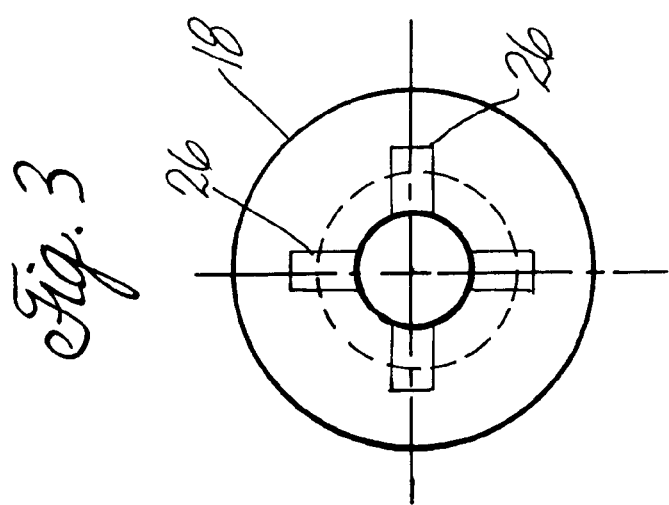

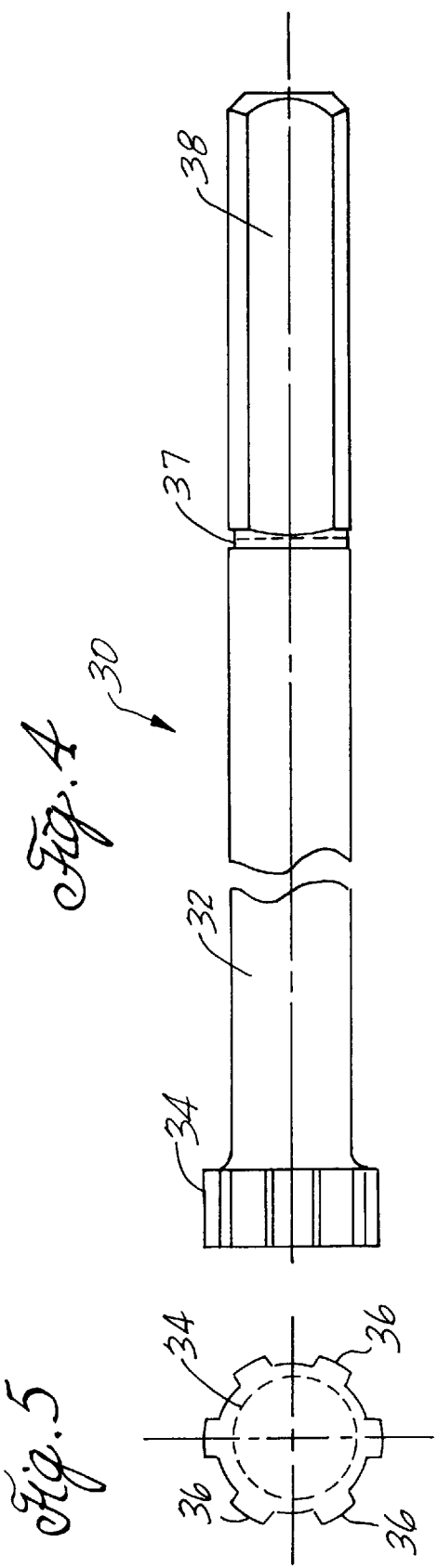

STRUCTURAL BLIND BOLT

CROSS-REFERENCE TO RELATED APPLICATION(S)

This application claims priority from U.S. Provisional Application Ser. No. 60/128,285 filed Apr. 8, 1999.

BACKGROUND OF THE INVENTION

This invention relates to blind fasteners for securing sheet material together and, in particular to a blind bolt having improved shear, bending and tension values.

Blind fasteners have become particularly useful in securing sheet materials where it is impossible to access the underside of the material. Typically, such fasteners are inserted into an aperture through the material and include a threaded stem for engaging a fastener. Rotation of the stem draws an expansion member into engagement with the underside of the material. Expansion may be aided by a nut body which forces the expansion member radially outward to engage the underside. Upon complete expansion to fully clamp the sheet material, the exterior end of threaded stem may be broken away to eliminate any protrusions from the exterior surface.

Such fasteners have wide application in aircraft and space vehicle assembly. However, the vibrations and sonic fatigue such vehicles are subject to causes loosening of the fasteners.

Previously available blind bolts comprise an externally threaded core bolt which is positioned within a hollow bolt and an internally threaded collar is threaded onto the core bolt. The core bolt also includes a breakneck along its length. The blind bolt is installed by placing the hollow bolt within an aperture in one or more workpieces and rotating the core bolt with respect to the collar. Rotation of the core bolt moves the collar up the hollow bolt causing it to expand radially. Further rotation of the core bolt continues to move the collar towards the head of the hollow bolt until it abuts the underside of the structure. The collar then stops moving axially and begins to expand radially wherein continued rotation causes the collar to reach a maximum diameter and an increasing compressive load on the structure. The resistence increases until it reaches a point when the breakneck on the core bolt shaft fractures in torsional loading.

A problem with previously available blind bolt designs is that they require a slight deformation in the grip area of the hollow bolt in order to captivate or offer rotational resistance to their core bolt design. The purpose of crimping or deformation is to prevent unloosening or separation of the components. This added friction often complicates the range of acceptable breakneck fracture levels. Another problem with currently available blind bolt designs is that if during installation should there be a tensile load sufficient enough to fail the core bolt, the collar would be free to fall from the hollow bolt, thus causing a structural weakness.

Consequently, a need exists for an improved blind bolt design with improved shear bending and tension values and which eliminates the problems associated with previously available blind bolt designs.

SUMMARY OF THE INVENTION

The present invention is directed to a structural blind bolt assembly with improved shear, bending and tension values and which has been designed to overcome the disadvantages of previous blind bolt designs. A blind bolt of the present invention includes a hollow bolt having a head portion, a grip section and a threaded portion located at an end opposite of the head portion. A cylindrical hole or aperture extends through the center of the bolt throughout its entire length. A cross-slot is imbedded into the surface of the head portion to accommodate a driving tool to prevent rotation of the hollow bolt during installation of the blind bolt assembly.

A core bolt having a long cylindrical shaft having a diameter slightly smaller than the internal diameter of the hollow bolt is positioned in the hollow bolt. Positioned on one end of the shaft of the core bolt is a head portion having an external spline drive configuration. Also positioned along the cylindrical shaft away from the head portion is a reduced diameter groove commonly referred to as a "breakneck". Extending above the breakneck along the cylindrical shaft are two parallel flat surfaces which extend to the end of shaft opposite of the head portion. The parallel flats function as a driver for rotating the core bolt during the assembly process.

The blind bolt assembly also includes a collar having a hollow cylindrical configuration. A portion of the internal diameter of the collar includes a smooth bore for a given length which leads into an internally threaded section. The internal threaded section is designed to mate with the threads on the end of the hollow bolt. Also positioned on the internal diameter of the collar is a splined section which is adjacent the threaded section and opposite the smooth bore section. The spline section has a mating configuration with the spline configuration of the core bolt. The spline section of the collar is slightly longer than the length of the mating splines of the core bolt to captivate the core bolt to the collar during final assembly.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention wherein:

FIG. 1 is a partial cross sectional side view of the blind bolt assembly of the present invention;

FIG. 2 is a partial cross sectional side view of the hollow bolt of the blind bolt assembly of FIG. 1;

FIG. 3 is an end view of the hollow bolt of FIG. 2;

FIG. 4 is a side view of the core bolt of the blind bolt assembly of FIG. 1;

FIG. 5 is an end view of the core bolt of FIG. 4;

DETAILED DESCRIPTION OF THE INVENTION

Figure 7:
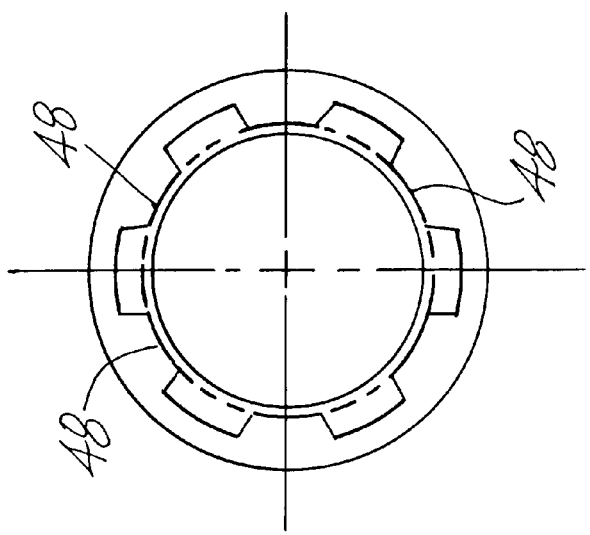
FIG. 7 is an end view of the collar of FIG. 6.

FIG. 1 illustrates the structural blind bolt assembly 10 of the present invention. The fastener 10 is utilized for securing workpieces such as overlapping sheets 12 and 14. Typically the sheets are made of materials commonly used in the aerospace industry including aluminum or other composite materials. The blind bolt assembly 10 is designed to create a clamping force thereby holding sheets 12 and 14 together. The blind bolt assembly 10 is particularly useful in the assembly of aircraft and space vehicle where access to an interior surface of sheet 14 is not possible. This application is typically known as a "blind" application.

The blind bolt assembly 10 of the present invention includes a hollow bolt 16 as also shown in FIGS. 2 and 3.

The hollow bolt 16 includes an enlarged head portion 18, a grip section 20 extending from the head portion 18 and a threaded end portion 22 extending from the grip section 20 opposite of head portion 18. Preferably the threaded end portion includes a left-handed thread. The threaded end portion 22 has a diameter which is smaller than the diameter of the grip section and is transitioned by a ramp section 24 extending between the threaded end portion and the grip section.

The enlarged head portion 18 is shown in the figures as having a flush configuration with sheet 12, however it is to be understood that the head portion can include other configurations such as, for example, hexagonal, protruding, or any other desirable shape. Embedded in the head portion from its surface are a plurality of installation slots 26 for receipt of a driving tool (not shown) to prevent rotation of the hollow bolt during installation of the blind bolt assembly. Although the installation slots 26 are shown as a cross slot configuration, it is to be understood that there are other means of preventing rotation and may include the form of a hexagonal, square, or other recess in the head portion for receipt of a driving tool.

Extending through the center of the hollow bolt 16 is a cylindrical hole 28 which extends through the head portion, the grip section and the threaded end section. The cylindrical hole 28 has a diameter smaller than the outside diameter of the threaded end section and receives a core bolt 30 as shown in more detail in FIGS. 4 and 5.

The core bolt 30 includes a long cylindrical shaft 32 that is slightly smaller in diameter than the diameter of the cylindrical hole 28 in hollow bolt 16. At one end of the shaft 32 is a head portion 34 having an outside diameter larger than the shaft 32 and larger than the diameter of cylindrical hole 28. The head portion has a plurality of splines 36 machined around the circumference of the head which are to be used as a drive which will be discussed in more detail below. Positioned along the shaft 32 of the core bolt away from the head portion 34 is a reduced diameter groove 37, commonly known as a "breakneck". Extending along the shaft 32 from groove 37 are a machined flat surface 38 extending to the end of the shaft opposite the head 34. The flat surfaces 38 are utilized as a driver for rotating the core bolt during the assembly process. It is to be understood that although the shaft is shown as having machined flat surfaces which serve as a driver, the core bolt can incorporate other features to accomplish this function, such as for example, a recess in the end surface of the shaft.

Figure 6:
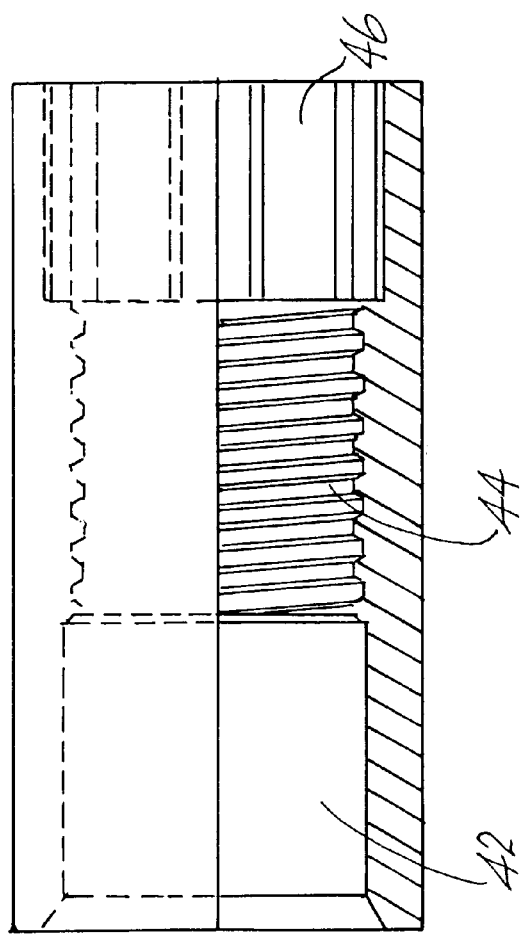
FIG. 6 is a partial cross sectional side view of a collar of the blind bolt assembly of FIG. 1.

As also shown in FIGS. 6 and 7, the blind bold assembly 10 of the present invention includes a collar 40. Collar 40 has a hollow cylindrical configuration having a smooth bore section 42 extending from one end of the collar. The smooth bore section of the collar terminates and transitions into a threaded section 44. The threaded section includes internal threads which are designed to mate with the threaded end portion of a hollow bolt, and also preferably are left-handed threads. The threaded section 44 of the collar terminates into a splined section 46 which includes a plurality of splines 48 machined around the inner diameter of the splined section 46. The splines 48 are sized to mate with the splines 36 on the core bolt. The spline section 46 has a length that is slightly longer than the length of the mating splines 36 on the core bolt. The purpose of this additional length is to captivate the core bolt to the collar in final assembly.

The blind bolt assembly 10 is initially assembled prior to installation through sheets 12 and 14. Initial assembly requires that the collar 40 be first installed by threading the collar onto the threaded end 22 of the hollow bolt. The collar 40 is rotated in a counter-clockwise motion until it abuts with the ramp section 24 on the hollow bolt. The core bolt 30 is then slipped into the interior of the hollow bolt and is rotated until splines 36 on the core bolt mate with splines 38 in the collar 40. Once the splines are aligned, the core bolt is depressed below the surface of the collar until the core bolt cannot travel any further. Further assembly occurs when the external diameter of the collar is radially swaged inwardly. This final operation captivates the core bolt to the collar and the collar is now physically captivated by the threads and becomes a one piece assembly.

The final assembly through sheets 12 and 14 occurs by attaching the blind bolt assembly 10 to a driving tool wherein the parallel flat surfaces 38 on the core bolt and the installation slots 26 on the hollow bolt will mate with the driving tool. The core bolt assembly is then placed into aligned aperture in sheets 12 and 14 and the driving tool is activated rotating the parallel flats on the core bolt in a clockwise direction. The rotational load is transferred from the core bolt shaft to splines 36 and then to the mating splines 48 on the collar 40. At this point, the threaded section 44 of the collar rotates on the threaded end 22 of the hollow bolt which in turn forces the smooth bore section 42 of the collar to move towards the head portion 18 of the hollow bolt and the inside surface 50 of the sheet 14. Continued rotation causes the collar to move and expand radially up the ramp section 24 of the hollow bolt. Further rotation will cause the smooth bore section 42 of the collar to continue moving towards the head of the hollow bolt until it abuts with inside surface 50 of sheet 14. At this point, the collar stops moving axially and begins to expand radially as shown in phantom at 52 of FIG. 1. Continued rotation of the core bolt causes the collar to reach a maximum diameter and an increasing compressive load on the sheets 12 and 14. The resistance increases until it reaches a point when the breakneck 37 on the core bolts shaft fractures in torsional loading. The breakneck acts as a load limiting factor to prevent over compression of sheets 12 and 14. Once the fracture at the breakneck occurs the installation is complete.

An advantage of the core bolt assembly 10 of the present invention over previous core bolt designs is that the threads for expanding the collar is located on the hollow bolt. The advantage of placing the threads on the hollow bolt is that a substantial increase in tensile loading of the joint occurs which is a result of the size of the thread and the resultant shallow helix angle which imparts a higher mechanical advantage than the smaller diameter of internal threads of previous designs. Another advantage of the blind bolt assembly of the present invention is that the collar is permanently attached to the hollow bolt after installation to the workpieces which is a result of the threading of the collar to the threads of the hollow bolt. After upsetting of the collar during installation, a thread lock occurs automatically during the deformation process. The core bolt assembly of the present invention provides for improved sheer load capabilities as compared to prior blind bolt designs. Superior sheer loads are the result of the variation in tolerances of internal and external threads which include major diameters, pitch diameters and minor diameters and thread angles. By utilizing a blind bolt assembly which includes cylindrical holes with a solid shaft, the tolerance variations are limited to the degree of fit between the core bolt and the hollow bolt.

Although the present invention has been described with respect to a preferred embodiment thereof, it is to be understood that changes and modifications can be made therein which are within the full intended scope of the invention as hereinafter claimed.

What is claimed is:

1. A fastener for compressively connecting at least two overlapping workpieces comprising:
   a hollow bolt sized to be received within aligned aperture in the workpieces having a head portion, a grip section extending from the head portion and a reduced diameter externally threaded end portion extending from the grip section adjacent a ramp section between the grip section and the threaded end portion;
   a core bolt having an elongated shaft positioned within a cylindrical hole in the hollow bolt and a drive portion located at one end of the shaft;
   a cylindrical collar having an internally threaded section for threadable receipt of the threaded end portion of the hollow bolt and a drive section for receipt of the drive portion of the core bolt.

2. The fastener of claim 1 wherein the head portion of the hollow bolt includes at least one installation slot.

3. The fastener of claim 1 wherein the core bolt includes a breakneck groove positioned along the shaft.

4. The fastener of claim 1 wherein the drive portion of the core bolt includes a plurality of splines positioned around the perimeter of the drive portion.

5. The fastener of claim 3 wherein the shaft of the core bolt includes engagement means for rotating the core bolt.

6. The fastener of claim 5 wherein the engagement means are two parallel flat surfaces extending axially along the shaft.

7. The fastener of claim 1 wherein the drive section of the collar includes a plurality of splines.

8. The fastener of claim 1 wherein the threads on the hollow bolt and on the collar are left-handed.

9. A fastening system comprising:
   a first workpiece having an aperture;
   a second workpiece having an aperture aligned with the aperture of the first workpiece;
   a hollow bolt sized to be positioned through the aperture of the workpieces and extend beyond the workpieces having an extremely threaded end portion;
   a core bolt passing through the hollow bolt having a driving head; and
   a collar having an internal threaded section and an internal driving section, the threaded section being threaded onto the threaded end portion of the hollow bolt and the drive section receiving the driving head of the core bolt.

10. The fastening system of claim 9 wherein the hollow bolt includes a head portion having at least one installation slot.

11. The fastening system of claim 9 wherein the core bolt includes a breakneck groove.

12. The fastening system of claim 9 wherein the driving head of the core bolt includes a plurality of splines positioned around a perimeter of the driving head.

13. The fastening system of claim 12 wherein the driving section of the collar includes a plurality of mating splines spaced around an internal diameter of the drive section.

14. A fastener comprising:
   an externally threaded hollow bolt;
   a core bolt extending through the hollow bolt having a spline drive positioned at one end of the core bolt; and
   a collar threaded on the hollow bolt and having a spline socket for receipt of the spline drive of the core bolt.

15. The fastener of claim 14 wherein the hollow bolt includes a head portion having at least one installation slot.

16. The fastener of claim 14 wherein the core bolt includes a breakneck groove.

17. The fastener of claim 14 wherein the core bolt includes an engagement means for rotating the core bolt.

18. The fastener of claim 17 wherein the engagement means are two parallel flat surfaces extending axially along the core bolt.

19. The fastener of claim 14 wherein the threads on the hollow bolt and in the collar are left-handed.

20. The fastener of claim 14 wherein the externally threaded hollow bolt includes a ramp section adjacent a threaded end portion.

* * * * *